H. N. HEILMAN.
POULTRY BROODER.
APPLICATION FILED JUNE 8, 1908.
920,740.
Patented May 4, 1909.
2 SHEETS—SHEET 1.
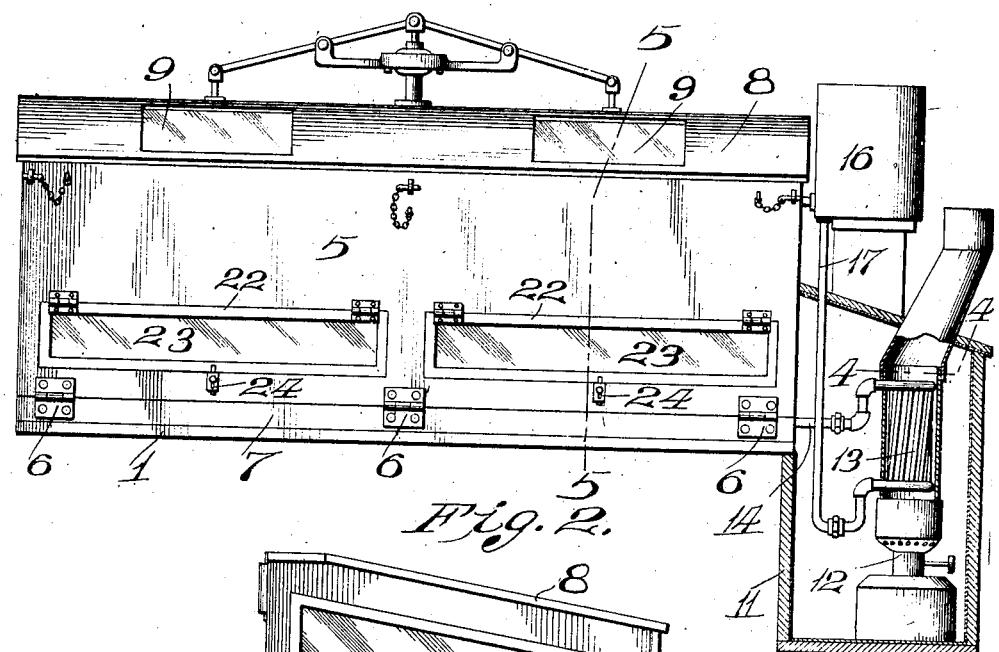
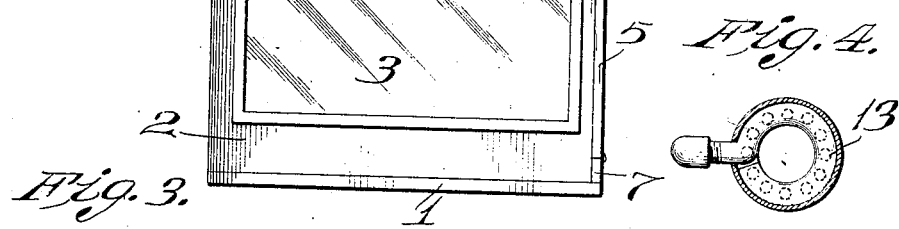
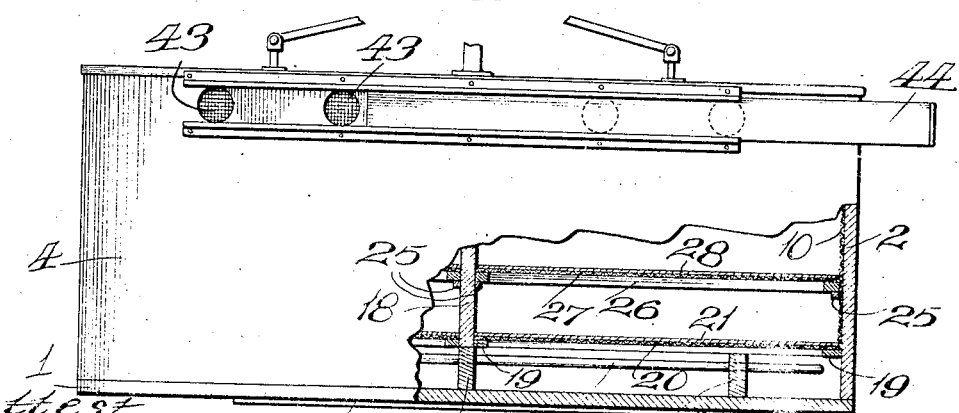

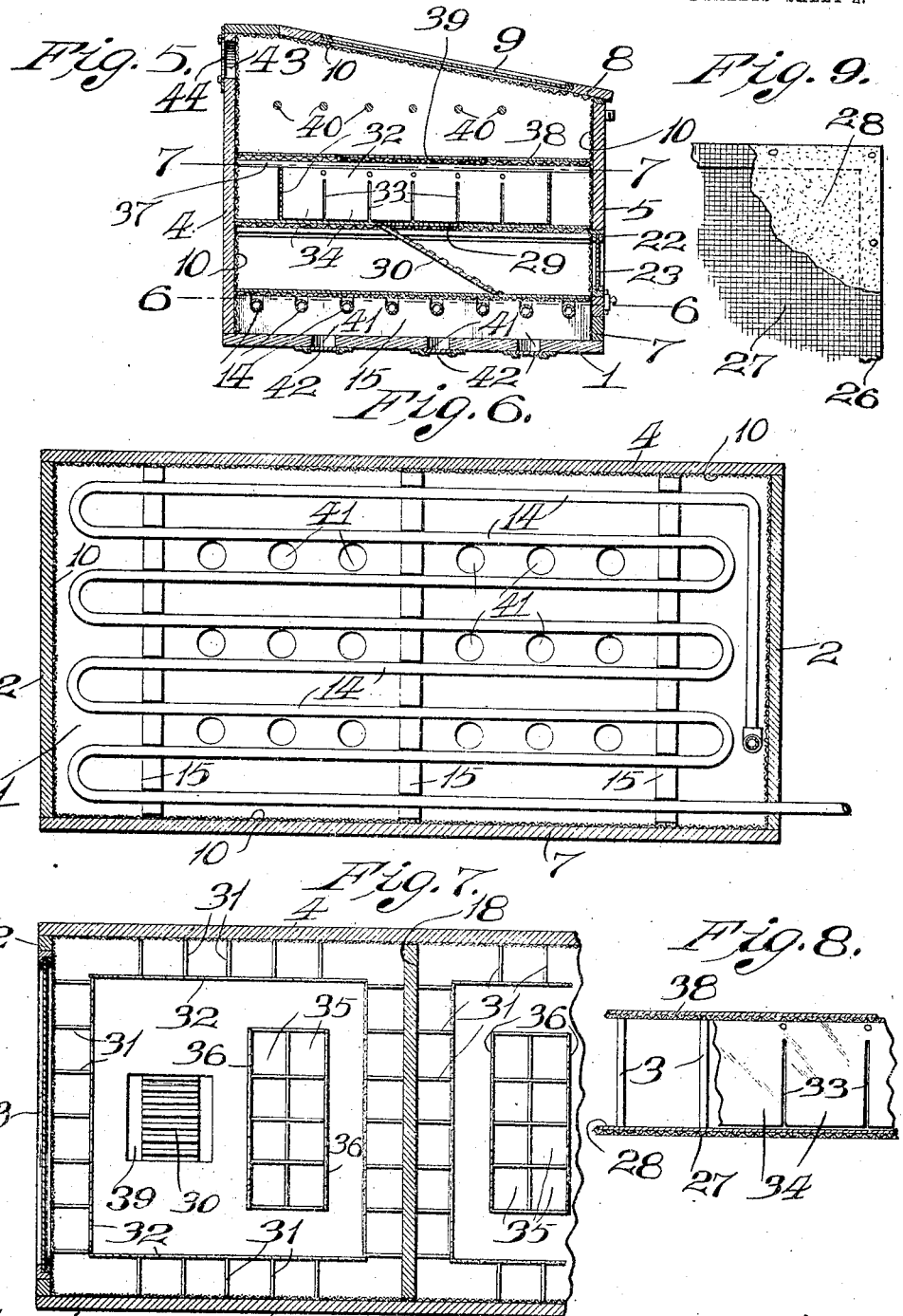

UNITED STATES PATENT OFFICE.

HENRY N. HEILMAN, OF ST. LOUIS, MISSOURI.

POULTRY-BROODER.

No. 920,740.　　　Specification of Letters Patent.　　　Patented May 4, 1909.

Application filed June 8, 1908.　Serial No. 437,359.

*To all whom it may concern:*

Be it known that I, HENRY N. HEILMAN, a citizen of the United States, and resident of St. Louis, Missouri, have invented certain new and useful Improvements in Poultry-Brooders, of which the following is a specification containing a full, clear, and exact description, reference being had to the accompanying drawings, forming a part hereof.

My invention relates to a poultry brooder, my object being to provide a simple, inexpensive brooder in which is arranged a plurality of compartments particularly adapted to be occupied by young poultry after the same has been hatched in an incubator, and the floors of the compartments in which brooder are made removable in order that they can be readily taken out and cleaned, or renewed; and said brooder being provided with simple heating and ventilating means.

A further object of my invention is to provide a hover chamber in which is arranged a series of compartments, and each compartment being of such size as to receive but a limited number of chicks, or other small poultry, thereby obviating the danger of smothering said young poultry as a result of crowding in the hover chamber.

To the above purposes, my invention consists in certain novel features of construction and arrangement of parts, which will be hereinafter more fully set forth, pointed out in the claims, and illustrated in the accompanying drawings, in which:—

Figure 1 is an elevation of a brooder of my improved construction, and showing the heating chamber in vertical section; Fig. 2 is an end view of the brooder; Fig. 3 is a rear elevation of the brooder with parts in section in order to more clearly illustrate the same; Fig. 4 is an enlarged horizontal section taken on the line 4—4 of Fig. 1; Fig. 5 is a transverse section taken on the line 5—5 of Fig. 1; Fig. 6 is a horizontal section taken on the line 6—6 of Fig. 5; Fig. 7 is a horizontal section taken on the line 7—7 of Fig. 5; Fig. 8 is an enlarged detail section illustrating the construction of the hover chambers, and the curtains or flaps in the front thereof; Fig. 9 is a detail view of one corner of one of the removable floors or partitions made use of in my improved brooder.

The body of my improved brooder is in the form of a rectangular housing of any convenient size, and comprises the bottom 1, end walls 2, one of which is preferably provided with a window 3, the rear wall 4, and front wall 5, which latter is in the form of a door, and being connected by hinges 6; and its lower end to a rail 7 located on the front edge of the bottom 1. Located on top of the housing so formed is an inclined cover or roof 8, which is preferably provided with windows 9; and the under side of this roof or cover; and the inner faces of the front and rear and end walls of the brooder housing are lined with sections of wire screen 10, which effectually prevents rodents and the like from gnawing through the walls of the brooder and destroying the young poultry therein.

Located at one end of the housing is a heating chamber 11, in which is located a heater, preferably in the form of a lamp 12; and arranged immediately over the burner of said lamp is a tubular coil 13, with one end of which connects a heating coil 14, which extends over the bottom 1 of the housing, and being supported by the transversely disposed notched bars 15; and the opposite end of this coil 14 extends vertically through the end of the housing, and is connected to an expansion tank 16 located on top of the housing 11; and leading from said tank to the end of the coil 13, opposite the end connected to the coil 14, is a pipe 17. This arrangement of piping provides for a circulation of hot water through the coil 15, thus thoroughly heating the interior of the brooder.

The body of the brooder may be divided into a number of compartments by providing transverse partitions, such as 18; and in the present instance, I have shown but one of these partitions, and the same being located directly on top of the center bar 15. Fixed to the side faces of the lower end of this partition 18, and to the inside faces of the end walls 2, immediately above the coil 14, is a pair of strips 19; and removably arranged on each pair of strips is a rectangular section of wire netting 20, which is covered with a section 21 of flexible material, such as canvas, thus forming soft floors for the young poultry occupying said brooder, and through which floors the heat from the water within the coil 14 readily radiates.

Located in the hinged door 5, immediately in front of the chambers above the removable floors just described, are rectangular frames 22, in which are located sections of glass 23, or analogous transparent material, said frames 22 being hinged at their top edges, and being provided with fastening devices 24 at their lower edges, in order to fasten said frames to the door 5.

Located on the side walls of the partition 18, and on the inner faces of the end walls 2, short distance above the strips 19, are strips 25; and removably positioned on each pair of strips is a rectangular frame 26, and on each frame is fixed a section 27 of wire netting covered by a section 28 of canvas, or analogous material. These sections 26 and 27 form floors for the hover chambers of the brooder; and formed through said floors are suitable openings 29, and leading from the floors comprising the sections 20 and 21, up through said openings 29 are inclined walks 30, which provide means for the passage of the young poultry from the lowermost floors up into the hover chambers.

Located on top of the floors of the hover chamber, and around the edges thereof, are vertically disposed partitions 31; and secured to the tops and front edges thereof are sections 32 of flexible material, which are slitted vertically, as designated by 33, immediately in front of said sections 32, in order to form flaps or curtains 34 in front of the compartments between the partitions 31. These small compartments are of such size as to readily accommodate two or three chicks, or the like, and by reason of said small compartments, crowding and consequent suffocation of the chicks is avoided in the hover compartments.

If desired, additional hover compartments, 35, may be formed on the floor composed of the sections 26 and 27, and which compartments are provided at their fronts with flaps or curtains 36.

Removably positioned on strips 37 which are fixed to the inner faces of the end walls of the brooder housing, immediately above the strips 25, are floors 38 composed of sections of wire netting, and overlaid by sections of canvas, or the like; and formed in the centers of each of these floors 38 are openings 39 (see Fig. 7), through which the chicks or the like pass from the hover compartments into the perching chambers above the floors 38; and in which perching compartments are arranged a series of horizontally disposed perches 40.

Formed in the bottom 1, at suitable distances apart, are apertures 41, which are normally closed by sliding plates 42, said apertures being for the purpose of permitting air to enter the brooder for the purpose of ventilation; and formed in the rear wall 4 of the brooder, adjacent the top thereof, is a series of openings 43, which are normally closed by a sliding plate 44; and which openings permit the outlet of air from the interior of the brooder.

When the brooder is in use, the heater 12 is lighted, and the heat of the flame thereof passes upward through the coil 13, heating the water therein, and causing a circulation of said heated water through said coil and through the coil 14 in the bottom of the brooder. The chicks, or other young poultry from the incubator, are placed in the compartment immediately above the heating coil and provided with the floor composed of the sections 20 and 21; and this compartment forms a range and feed ground for the young chicks and the like. The interior of this compartment is lighted by means of the window 3, in one of the end walls of the brooder, and by means of the hinged windows arranged in the hinged door 5. At night, the young chicks and the like readily find their way up the inclined walk 30, into the hover compartments, and in turn pass into the smaller compartments between the partitions 31, in front of which are arranged the flaps or curtains 34. As the chicks and the like grow older and gain in strength, they will pass upward through the openings 39, and into the perching chamber, and will roost on the perches 40 therein. The slides 42 and 44 are manipulated to open or close the draft openings 41 and 43, thus regulating the ventilation of air through the brooder; and, when desired, the door 5 can be swung downward in order to remove the horizontal partitions which form the floors of the various compartments.

If desired, a thermostatic damper regulator may be arranged in the top of the brooder, as shown in Fig. 1, thus providing automatic means for controlling the ventilation through the brooder.

A brooder of my improved construction is simple, inexpensive, is very compact, provides means for accommodating a large number of young chicks, or the like, prevents crowding in the hover compartment, and the partitions forming the floors of the various compartments may be readily removed in order to be cleaned, or renewed.

I claim:

1. In a poultry brooder, a housing, a series of removable floors arranged therein to form a feeding compartment in the lower portion of the housing, a hover compartment immediately above the feeding compartment, and a perch chamber above the hover compartment, there being openings formed in the floors below the perch chamber and hover compartment in order to establish communication between the various compartments and chambers, a series of partitions arranged on the floor of the hover compartment to divide the same into a series of small compartments, a flexible curtain arranged in front of each of the small compartments, and a series of perches arranged in the perch chamber.

2. In a poultry brooder, a housing, a series of removable floors arranged therein to form a feeding compartment in the lower portion of the housing, a hover compartment immediately above the feeding compartment, and a perch chamber above the hover compartment, there being openings formed in the floors below the perch chamber and hover compartment in order to establish communication between the various compartments and chambers, a series of partitions arranged on the floor of the hover compartment to divide the same into a series of small compartments, a flexible curtain arranged in front of each of the small compartments, and a hot water heating coil located in the lower portion of the housing beneath the floor of the feeding compartment.

3. In a poultry brooder, a housing, a series of removable floors arranged therein to form a feeding compartment in the lower portion of the housing, a hover compartment immediately above the feeding compartment and a perch chamber above the hover compartment, which floors each comprise a section of reticulated material and a fabric section arranged on said section of reticulated material.

In testimony whereof, I have signed my name to this specification, in presence of two subscribing witnesses.

HENRY N. HEILMAN.

Witnesses:
M. P. SMITH,
E. L. WALLACE.